July 6, 1926.
M. SCHWARTZ
BUSHING STRUCTURE
Filed Nov. 27, 1925
1,591,058
2 Sheets-Sheet 1
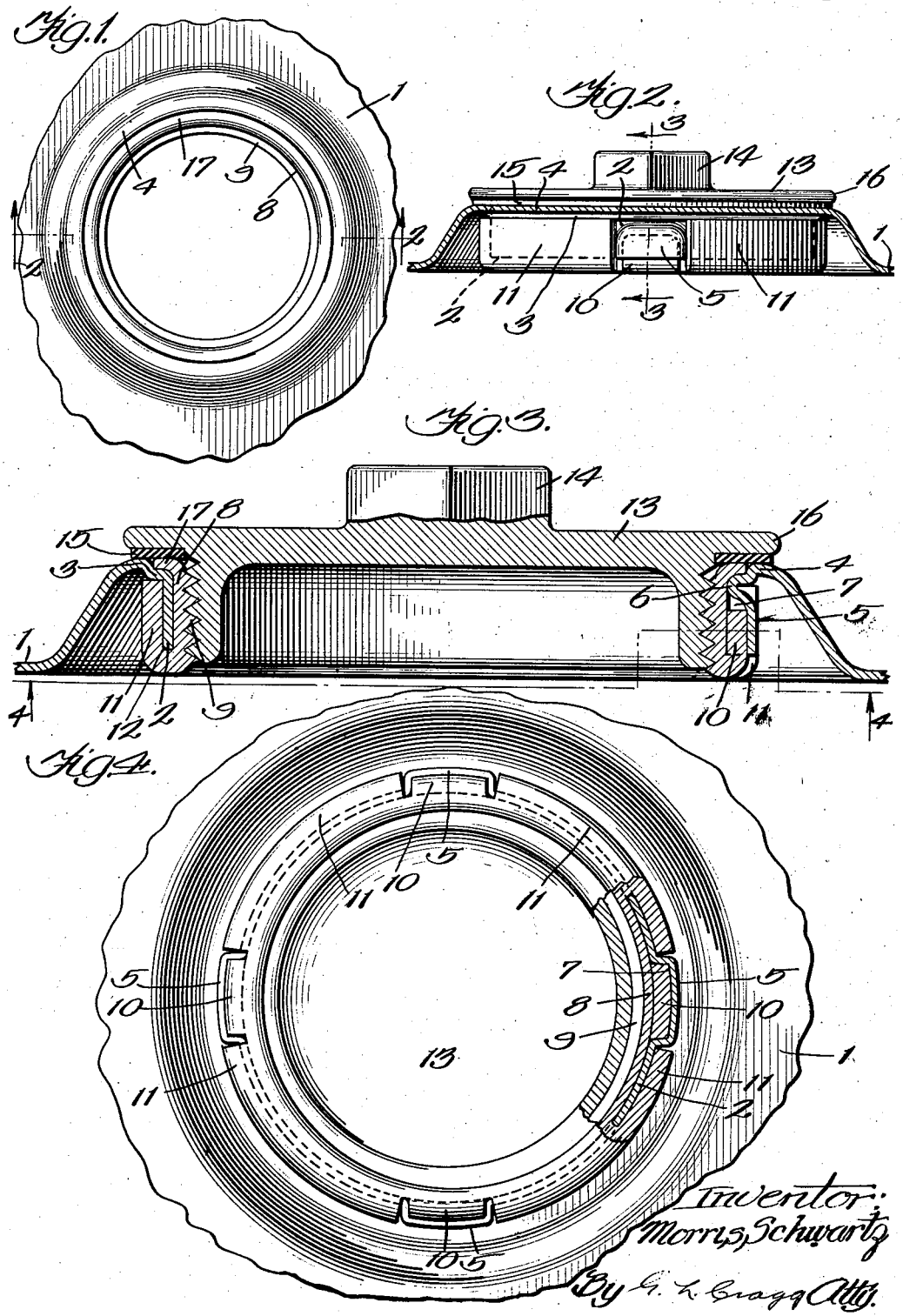

July 6, 1926.
M. SCHWARTZ
BUSHING STRUCTURE
Filed Nov. 27, 1925      2 Sheets-Sheet 2
1,591,058
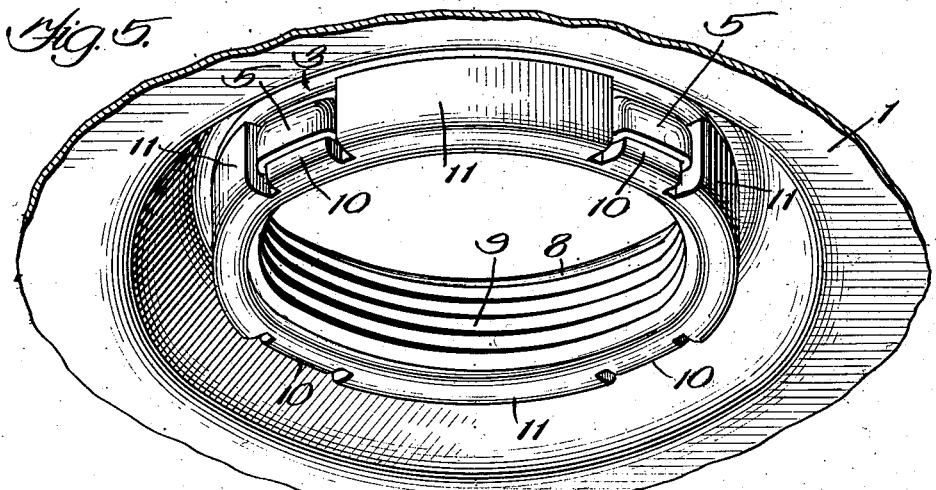
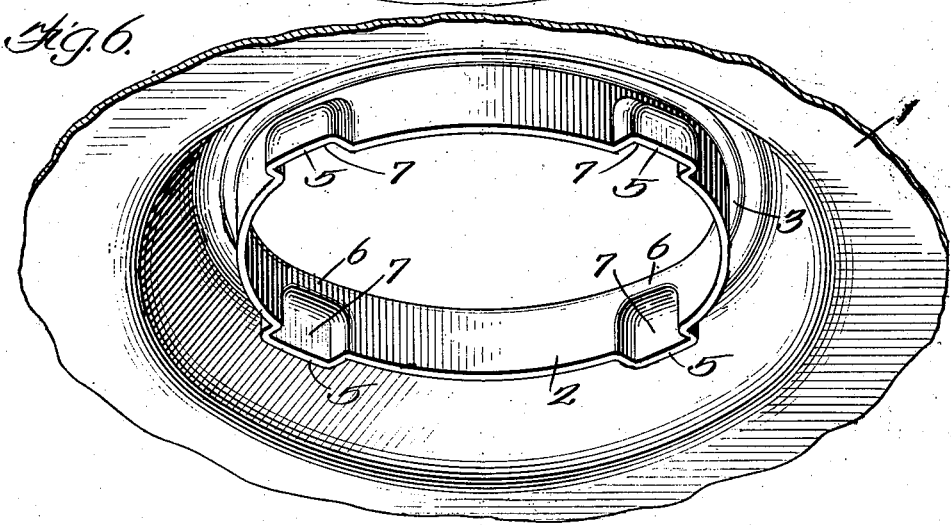
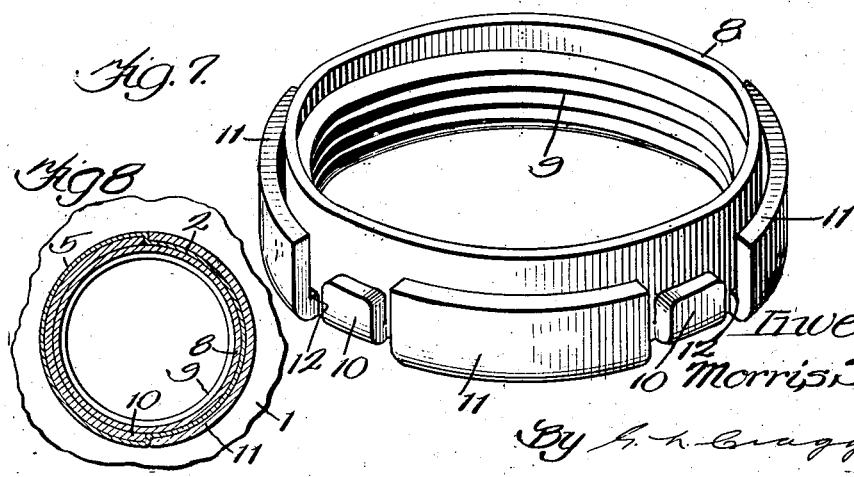
Inventor:
Morris Schwartz
By G. L. Cragg Atty.

Patented July 6, 1926.

1,591,058

UNITED STATES PATENT OFFICE.

MORRIS SCHWARTZ, OF CHICAGO, ILLINOIS.

BUSHING STRUCTURE.

Application filed November 27, 1925. Serial No. 71,781.

My invention relates to sheet metal members, such as the heads or other wall portions of metallic barrels or containers, though the invention is not to be thus limited, and which are provided with rims that enclose bushings, these bushings in the case of barrels or other containers being provided to receive bungs or stoppers and being usually interiorly threaded in order that the bungs may be screwed into the same.

My invention has for its object the provision of an improved construction of the rim portions of such sheet metal members and the bushings surrounded thereby, whereby these two elements may be so locked that the bushings may not be turned and thereby disturb the fluid-tight assembly of the bushings and rims.

In carrying out my invention, the rim upon the sheet metal body member is outwardly bulged preferably from its unattached edge toward its attached edge and the bushing is formed with a body portion which is surrounded by the rim and one and preferably two returned portions upon the exterior of its body portion. Where at least two returned bushing portions are employed, one is received in the recess formed by the bulging of the rim and the other is upon the exterior of the rim, the rim being received between this latter returned portion and the body portion of the bushing. The returned portions of the bushing engage the bulged portion of the rim and thereby hold the bushing from rotation.

The invention will be more fully explained in connection with the accompanying drawings in which Fig. 1 is a plan view illustrating a construction of my invention, the bung or stopper being absent; Fig. 2 is a sectional view on line 2—2 of Fig. 1 with the bung in place; Fig. 3 is a sectional view, on a larger scale, taken on line 3—3 of Fig. 2; Fig. 4 is a sectional view taken on line 4—4 of Fig. 3, on a smaller scale than Fig. 3; Fig. 5 is a perspective view showing the bushing and sheet metal member in assembly; Fig. 6 is a perspective view similar to Fig. 5 but with the bushing absent; Fig. 7 is a perspective view of the bushing alone; and Fig. 8 is a sectional view of another form of the invention, taken at right angles to the axis of the bushing and the surrounding rim of the sheet metal member.

The sheet metal member 1, illustrated, may form a part of a structure which is to be supplied with a bushing, such as the end or other wall of a metallic barrel or container. This metal member is formed with a generally circular rim portion 2 which is angular to the body portion of the sheet metal member, this body portion being desirably inclusive of a dished portion 3 that surrounds the rim, there being an annular bead 4 which margins the attached portion of the rim. Said rim thus surrounds a generally circular opening formed through the sheet metal member to permit of the passage of fluid or material through said member. The rim is outwardly bulged at 5 at one place as indicated in Fig. 8 and at a number of places as indicated in Figs. 2 to 6 inclusive, the bulging extending from the unattached edge of the rim toward its attached edge and preferably only to the rim portion or portions 6 which margin the attached edge of the rim, adjacent the bead 4. A recess 7 is thus formed wherever the rim is bulged as described, each recess being open, prior to the assembly of the bushing with the sheet metal member, for the reception of a returned portion of the bushing, as will presently appear.

The bushing has a body portion 8 which is preferably interiorly threaded as indicated at 9, this body portion being surrounded by the rim and having as many returned portions 10 as there are recesses 7 and which are received in said recesses, being passed thereinto as the bushing is inserted into the rim from the unattached edge of the rim toward the attached edge of the rim. In the structure of Fig. 8 there is but one returned portion 10 as there is but one bulged portion of the rim to receive it. The returned bushing portion received in each recess desirably substantially fills the recess so as to engage not only the outer arcuate wall of the recess but also the end walls of the recess that are transverse to the rim, these transverse walls of the recess and the returned portion of the bushing cooperating to prevent the bushing from turning. The bushing is desirably also provided with as many additional returned portions 11 as there are returned portions 10, the structure of Fig. 8 having one such returned portion 11 whereas the bushing shown in the remaining figures has four such returned portions 11 alternating with the four returned portions 10. Each returned portion 11 is upon the exterior of the rim, the rim being between this returned bushing portion and the body portion 8 of the bushing. Each returned bushing portion desirably fills the gap between the transverse recess walls on the rim between which such returned portion 11 is disposed, whereby rotation of the bushing with respect to the rim is further guarded against. The returned bushing portions upon the interior and exterior of the rim are in close contact with the rim to guard against any transverse movement of the bushing with respect to the rim and to make the union between the rim and bushing fluid-tight, the body portion of the bushing engaging the interior surface of the rim, where unrecessed, including the portions 6 of the rim and snugly fitting the same to guard against leakage. The fluid-tight union between the rim and bushing is furthered by the engagement of the unattached edge of the rim with the base portions 12 of the returned bushing portions 11 that join these bushing portions with the bushing body 8. It is obvious that many of the advantages of my construction may be retained with the returned portions upon the exterior of the rim or the returned portions upon the interior of the rim eliminated.

The bung or stopper 13 is received in the bore of the bushing. If the bushing is interiorly threaded, the bung is correspondingly threaded and has a polygonal formation 14, whereby a wrench may be applied thereto to screw it tightly into place. A sealing gasket 15 may be interposed between a flange 16 on the bung and the bead 4 and also to overlie the flange 17 formed at the end of the bushing opposite the end from which the returned portions 10 and 11 spring. The flange 17 desirably overlies the unattached ends of the returned portions 11 of the bushing, the circular portion 18 of the sheet metal body member 1 being desirably closely gripped between the flange 17 and the returned bushing portions 11 to effect a further fluid-tight connection between the bushing and the sheet metal member.

Changes may be made without departing from the invention.

Having thus described my invention, I claim:

1. The combination with a sheet metal member inclusive of a body portion and a circular rim portion angular to the body portion and surrounding a circular opening formed through said member, said rim being outwardly bulged from its unattached edge to a portion of the rim margining its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing.

2. The combination with a sheet metal member inclusive of a body portion and a generally circular rim portion angular to the body portion and surrounding a generally circular opening formed through said member, said rim being outwardly bulged from its unattached edge toward its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing.

3. The combination with a sheet metal member inclusive of a body portion and a circular rim portion angular to the body portion and surrounding a circular opening formed through said member, said rim being outwardly bulged from its unattached edge to a portion of the rim margining its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, one of the returned portions of the bushing abutting a side of the bulged rim portion that extends transversely of the rim.

4. The combination with a sheet metal member inclusive of a body portion and a generally circular rim portion angular to the body portion and surrounding a generally circular opening formed through said member, said rim being outwardly bulged from its unattached edge toward its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, one of the returned portions of the bushing abutting a side of the bulged rim portion that extends transversely of the rim.

5. The combination with a sheet metal member inclusive of a body portion and a circular rim portion angular to the body portion and surrounding a circular opening formed through said member, said rim being outwardly bulged from its unattached edge to a portion of the rim margining its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, each of the returned portions of the bushing abutting a side of the bulged rim portion that extends transversely of the rim.

6. The combination with a sheet metal member inclusive of a body portion and a generally circular rim portion angular to the body portion and surrounding a generally circular opening formed through said member, said rim being outwardly bulged from its unattached edge toward its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, each of the returned portions of the bushing abutting a side of the bulged rim portion that extends transversely of the rim.

7. The combination with a sheet metal member inclusive of a body portion and a circular rim portion angular to the body portion and surrounding a circular opening formed through said member, said rim being outwardly bulged from its unattached edge to a portion of the rim margining its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, both of the returned portions of the bushing abutting one side of the bulged rim portion that is interposed between said returned bushing portions and extends transversely of the rim.

8. The combination with a sheet metal member inclusive of a body portion and a generally circular rim portion angular to the body portion and surrounding a generally circular opening formed through said member, said rim being outwardly bulged from its unattached edge toward its attached edge; of a bushing having a body portion surrounded by said rim and two returned portions upon the exterior of its body portion, one received within the recess formed by the bulging of the rim and the other being upon the exterior of the rim that is received between this latter returned bushing portion and the body portion of the bushing, both of the returned portions of the bushing abutting one side of the bulged rim portion that is interposed between said returned bushing portions and extends transversely of the rim.

9. The combination with a sheet metal member inclusive of a body portion and a circular rim portion angular to the body portion and surrounding a circular opening formed through said member, said rim being outwardly bulged from its unattached edge toward its attached edge; of a bushing having a body portion surrounded by said rim and a returned portion upon the exterior of its body portion and surrounded by the rim and received within the recess formed by the bulging of the rim.

10. The combination with a sheet metal member inclusive of a body portion and a circular rim portion angular to the body portion and surrounding a circular opening formed through said member, said rim being outwardly bulged; of a bushing having a body portion surrounded by said rim and a returned portion upon the exterior of its body portion and disposed upon the exterior of the rim, the rim being received between said returned bushing portion and the body portion of the bushing and having its bulging portion in holding engagement with said returned portion.

In witness whereof, I hereunto subscribe my name.

MORRIS SCHWARTZ.